United States Patent [19]

Hodgdon

[11] Patent Number: 5,152,901
[45] Date of Patent: Oct. 6, 1992

[54] POLYAMINE-POLYAMIDE COMPOSITE NANOFILTRATION MEMBRANE FOR WATER SOFTENING

[75] Inventor: Russell B. Hodgdon, Concord, Mass.

[73] Assignee: Ionics, Incorporated, Watertown, Mass.

[21] Appl. No.: 584,555

[22] Filed: Sep. 14, 1990

[51] Int. Cl.⁵ .............................................. B01D 61/08
[52] U.S. Cl. ................................... 210/654; 210/490; 210/500.37; 210/500.38
[58] Field of Search .................... 210/500.37, 490, 654, 210/500.38, 638; 427/244, 245, 246

[56] References Cited

U.S. PATENT DOCUMENTS

| | | | |
|---|---|---|---|
| 3,647,086 | 3/1972 | Mizutani et al. | 210/500.38 |
| 4,659,475 | 4/1989 | Liao, et al. | 210/500.37 X |
| 4,913,816 | 4/1990 | Waite | 210/500.37 X |

*Primary Examiner*—Frank Spear
*Attorney, Agent, or Firm*—Norman E. Saliba

[57] ABSTRACT

A thin film composite (TPC) ultrafilter/hyperfilter water softening membrane on a microporous substrate is produced by an interfacial polymerization reaction between (1) an aqueous phase comprising a blend of water soluble and water dispersible compounds, the former containing piperazine and polyamines, the latter using a chlorine or other oxidant reacting compound which protects the resulting membrane from damage by any chlorine present and (2) an organic phase comprising polyfunctional agents capable of reacting and/or polmerizing with one or more of the ingredients of said aqueous phase.

9 Claims, No Drawings

POLYAMINE-POLYAMIDE COMPOSITE NANOFILTRATION MEMBRANE FOR WATER SOFTENING

This invention is directed to a composition of matter which allows the pressure membrane separation of calcium and magnesium salts from sodium salts in either chloride or preferably mixed chloride-sulfate form. The aforementioned composition of matter is a highly crosslinked polyamine-polyamide polymerized upon a microporous polysulfone sheet and co-blended with a latex polymer having the ability to react with chlorine or other oxidants while processing feed streams for the separation of calcium (or magnesium) from sodium salts. This composition of matter is a nanofiltration membrane which lies between hyperfiltration (rejects both calcium and sodium salts) and ultrafiltration (rejects neither calcium or sodium salts). This composition of matter is also a hypochlorite or chlorine resistant nanofiltration membrane capable of filtering out organic molecules having molecular weights generally exceeding 200 Daltons.

BACKGROUND OF THE INVENTION

Salt and solute rejecting membranes suitable for use in the desalination of aqueous solutions are the subject of numerous patents. Cadotte (U.S. Pat. No. 4,259,183) discloses permselective (salt rejecting) multilayer membranes in which there is a microporous polysulfone substrate layer and a juxtaposed polyamide layer made from an aromatic triacyl-halide and an essentially monomeric, polyfunctional secondary amine. Scala et al (U.S. Pat. No. 3,744,642) discloses multilayer membranes in which one layer is a porous substrate and the other juxtaposed layer is a polyamide, a polyphenyl ester, or a polysulfonamide. Hara et al (U.S. Pat. No. 4,353,802) discloses semipermeable composite membranes in which the membrane material is crosslinked using polyfunctional aromatic acid halides. Kamiyama et.al. (U.S. Pat. No. 4,619,767) discloses permselective multilayer membranes having (1) a microporous substrate layer (2) an ultra thin layer of a crosslinked polyvinyl alcohol/amino compound and (3) a porous inner layer of water insoluble polyvinyl alcohol located between the porous substrate and the ultrathin layer. Other patents disclosing the preparation and properties of thin film composite membranes are U.S. Pat. Nos. 3,951,815; 4,005,012; 4,039,440; 4,277,344; 4,885,091; 4,895,661; 4,802,984, 4,913,816 and many others.

A discussion of chlorine tolerance of reverse osmosis membranes, (equally applicable to nanofiltration membranes be they anisotropic or thin film composite) is presented by Robert J. Petersen in a 1986 paper entitled "The Expanding Roster of Commercial Reverse Osmosis Membranes". It was stated therein that the thin film composite membranes in which the thin polyamide layer was composed of the reaction product of trimesoyl chloride and piperazine had the best chlorine tolerance for a polyamide TFC membrane, but might not be fully resistant to chlorine degradation despite these claims. Time has proven these claims of chlorine resistance to be invalid.

A polymeric material having a large surplus of primary, secondary, and even tertiary amine functionalities will have a large chlorine tolerance to hypochlorite or chlorine containing solutions in the 0.1 to 1.0 ppm concentration range. The thin film composite membranes of the present invention have intentionally been constructed with large excesses of amine functional groups for the express purpose of upgrading their abilities to neutralize and tolerate small quantities of chlorine or hypochlorites which may be present in water to which these TFC membranes may be exposed. Concurrently, the membranes of the present invention are also protected against chlorine destruction by the co-addition of double bond containing water miscible latexes. These become a mixed component of the TFC during the formation of the thin film polyamides at the interface of a hexane solution containing acyl chlorides and the aqueous phase containing piperazine, polyamines, a butadiene-styrene latex and caustic to accelerate the formation of the interfacial polyamides. The unsaturated latex (the subject of W. A. Waite's U.S. Pat. No. 4,913,816) reacts with chlorine present in feed waters to also render the TFC membrane chlorine tolerant.

The nanofiltration membrane of the present invention will contain two species capable of making the TFC membrane chlorine (or hypochlorite) tolerant. These species are:

a.) An added precipitated latex such as butadiene-styrene as disclosed in U.S. Pat. No. 4,913,816 which patent is incorporated herein by reference.

b.) Polyamines incorporated into the TFC polyamide

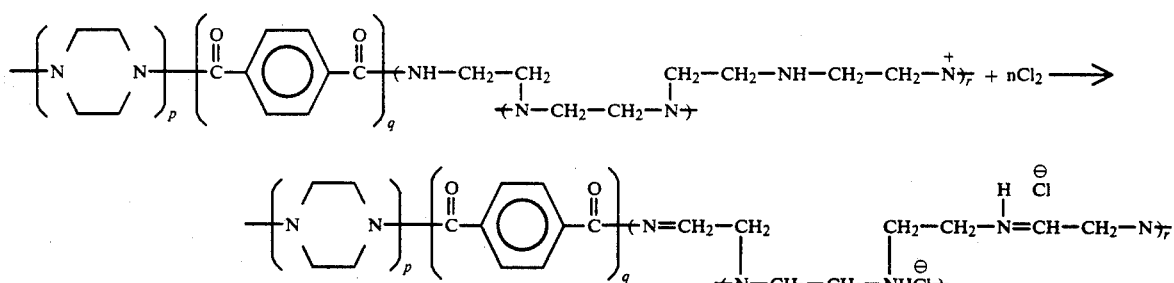

The addition of polyamides to the composition of the amino portion of the TFC polyamides of the present invention have been found to do much more than provide a reducing compound for the neutralization of excess chlorine normally added to the feed waters to be treated.

The polyamines used in preparing the TFC polyamine-polyamide of this invention also provide excess crosslinking capability during the formation of the TFC polyamide. Thus excess crosslinkage, when reacted with diacyl or triacyl halides to form a polyamine-polyamide thin film has been found to effect the degree separation of sodium and alkaline earth salts such as $Ca^{+2}$ and $Mg^{+2}$. One such example of a polyamine is tetraethylene pentamine (TEPA):

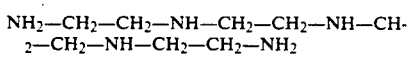

which has no less than five reactive sites for combination with a triacyl halide, such as trimesoyl chloride

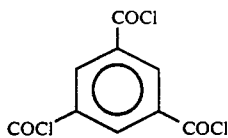

or a diacyl halide, such as isophthaloyl chloride below:

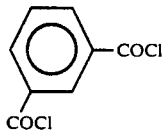

The prolonged reaction of polyamines with di or triacyl halides will result in a TFC interfacially created polymer having a high degree of crosslinkage, which should result in a composite polymer having minimum hydrogen bonding between the polymer chains due to spacial restrictions (or constrictions) of the network polymer formation. It is believed that such special constrictions will allow the formation of pore sizes of higher volume and average diameter than those formed by the direct reaction of di or triacyl halides with a bifunctional amine especially in view of the fact that using the trifunctional trimesoyl chloride sometimes forms lightly crosslinked amides due to the formation of a COOH group rather than a network polymer as shown below:

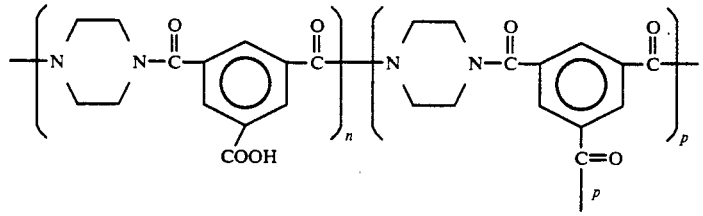

where n is customarily >p.

BRIEF DESCRIPTION OF THE INVENTION

The prior art has not addressed the end effect of creating a thin film composite reverse osmosis or nanofiltration membrane having chlorine tolerance and a very high degree of crosslinking during the formation of the thin film polyamides. A very high degree of crosslinking during interfacial polymerization will tend to give 1) a much lowered degree of polymer chain flexibility, (i.e. very high network structures) by the use of multifunctional amino compounds to react with the diacyl or triacyl halides and 2) a polymeric structure which will have great difficulty in close packing and forming crystalline bundles or zones via hydrogen bonding or Van Der Waal bond attractions. This high degree of crosslinking of the TFC polymerizate will yield a stiff, inflexible structure having defined pore sizes of small but inflexible diameters. As shown in the examples hereinafter, it appears that the pores are of such size as to exclude hydrated $Ca^{+2}$ ions and $Mg^{+2}$ ions in preference to hydrated $Na^{+1}$ ions regardless of the anions associated with each. This results in a polymerizate that will remove hardness from feed waters under a pressure differential.

The present application discloses how to effect variances in pore sizes of thin film composite polyamides by the incorporation of polyamines into a formulation containing piperazine followed by reaction with di and triacyl halides.

It will also be shown how the incorporation of polyamines into the TFC formulation allows for a distinct separation (under low pressures) of calcium and magnesium salts from sodium salts thus yielding a pressure driven softening membrane.

It will further be shown hereinafter that the pore size is the principal reason for the hardness separation and not the calcium or magnesium chelation with excess polymer groups. In the present invention the separation of hardness is pH insensitive and thus the residual amino groups do not give rise to the separation by way of coordination of their electron pairs with bivalent $Ca^{+2}$ or $Mg^{+2}$ atoms.

It will also be shown hereinafter that exhaustive methylation of the unreacted amino groups (whereby all electron pairs are covered by methyl groups) does not appear to affect the separation of calcium (or magnesium) salts from sodium salts. Both the rejection and flux rate of the TFC membranes were changed by methylation but not the degree of separation of bivalent cation from univalent cation. It does appear that exhaustive methylation changed the pore sizes of the lightly crosslinked TFC (this would be expected whence methyl chloride groups are added to the TFC structures) and affected both $Na^+$ as well as $Ca^{+2}$ to the same degree of rejection hence no co-ordination of $Ca^{+2}$ can be in force during the pressure driven separation of calcium salts from sodium salts. The noted increase in flux rate during the testing of the methylated vs. unmethylated TFC membranes is credited to a small degree on the pore size increase during methylation of the polyamine-polyamide network structure and is not surprising.

It will further be shown, that in the absence of polyamines during the preparation of the thin film composite structure, that the simple polyamide structure gave nearly equivalent separations of sodium and calcium ions under pressure with both ions being removed at high rejection rates.

In finality, this invention describes a synthetic route to the preparation of nanofiltration membranes which can easily separate at respectable flux rates, salts of sodium from those of calcium or magnesium whether in the chloride, sulfate or mixed chloride-sulfate form. One may also separate sucrose from sodium chloride at the same time. The membrane has chlorine tolerance and in principle is merely a copolymerization of triacyl or diacyl halides with a mixture of polyamine, latex polymers containing unsaturation and piperazine; the resulting network polyamide being spatially structured to separate alkali metal salts from alkaline earth metal salts.

DETAILED DESCRIPTION

The procedures of W. A. Waite (U.S. Pat. No. 4,913,816) are illustrative of the conditions needed for preparing thin film composite membranes of the present invention. The process consists essentially of several steps as follows:

A microporous substrate with pores in the range of 0.005 to 0.5 microns in diameter is prepared. This may be accomplished preferably with a polysulfone linear polymer, cast from a 15% solution thereof in dimethyl formamide solvent and immediately quenched in ultrapure water to precipitate the polysulfone membrane and extract its solvent.

This base membrane substrate (dried and stored, or fresh and wet) is then equilibrated with the "water phase" solution containing the desired emulsion, amino compound, polyamino compound, etc.; and the excess solution removed from the surface by a draining, rolling, or sponging procedure. The concentration of the components in the "water phase" solution is an important factor in the performance of the resulting composite.

The loaded substrate is then immersed in the "organic phase" solution containing the polyfunctional crosslinking agent in a solvent such as hexane or mixtures thereof (solvents which do not adversely affect the porous structure of the polysulfone substrate) for 5–90 secs. (preferably 15–35 secs.) at room temperature.

The resulting composite is then dried at temperatures of 20°–100° C. (preferably at 25°–30° C.), for periods of 1 to 24 hrs. (preferably about 16 hrs) to establish adhesion of the surface film to the polysulfone substrate. The residual components and reaction by-products are extracted by soaking in water.

It is normal practice to treat feed waters with small amounts of chlorine or sodium hypochlorite, so as to kill harmful microorganisms present in water. After chlorination it becomes necessary to remove any residual chlorine and other oxidants (in some cases even dissolved oxygen of the air) remaining in the feed water prior to reverse osmosis treatment since such oxidants are known to irreversibly damage the polyamide thin film of the membrane and substantially reduce their performance resulting in premature failure. Removal of residual chlorine in the feed water is accomplished both by reductive reaction with the polyamine-polyamide TFC of this invention and concurrently therewith by reaction with the reducing latex polymer co-precipitated with the TFC polyamine-polyamide thin film.

The polyamines used in this invention are selected from the group consisting of diethylene triamine, triethylene tetramine, tetraethylene pentamine, polyethyleneimine, and other organic compounds containing saturated or unsaturated alkyl groups covalently joined to three or more primary and secondary amino groups. These polyamines are readily available from commercial sources.

The latex (emulsions) used in the present invention are dispersions of water insoluble, natural or synthetic polymers or copolymers having functional groups either appending or comprising the polymer chains, which react with and essentially reduce small quantities of chlorine, sodium or calcium hypochlorite or other oxidizing agents contained in a feed solution being treated for hardness or total salt removal. The vast majority of synthetic latices are prepared directly by emulsion polymerization and have particle sizes (in aqueous dispersion) of 500–1500Å (0.05–0.15 microns) prior to film casting.

A very large number of synthetic latices are available commercially and are readily blended into the thin film composite membranes of this invention. Such latices include, for example, nitrile latexes (aqueous, anionic dispersions of butadiene-acrylonitrile copolymers), styrene butadiene latexes, styrene-butadiene-4-vinyl pyridine latexes, phenolic latexes, resorcinol-formaldehyde latexes, and other latexes which will reduce chlorine, hypochlorite ion, hypochlorous acid, or other oxidants such as hydrogen peroxide, sodium carbonate peroxide complex, ozone, persulfates, bismuthates, or permanganates.

The above reducing latexes are commercially available whereby the polymers or copolymers resulting therefrom will vary as to their hardness, flammability, adhesive qualities, antioxidant properties, temperature flexibility, chemical resistance, etc. The term latexes, emulsions, and dispersions are used interchangeably herein to have the same meaning.

One amino compound used in this invention is enumerated in Cadotte (U.S. Pat. No. 4,259,183) namely piperazine

a secondary amine having two (N—H) groups so as to react with a mixture of isophthaloyl chloride and/or trimesoyl chloride to form a thin polyamide in the presence of a second polyamine compound and a reducing (double bond containing) polymeric latex onto a microporous polysulfone sheet to form the membrane. The second polyamine which is a reducing amine and a principal component of this invention, is typified by the compound tetraethylene pentamine. This polyamine, copolymerized with piperazine, with the above acylchlorides (either as a mixture of the two acylchlorides or individually) forms a very highly crosslinked polyamine-polyamide film onto a microporous polysulfone sheet.

Any combination of trifunctional or polyfunctional amines can be employed such as:

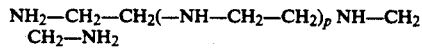

where P=0,1,2,3, etc. along with piperazine, to interfacially polymerize with any polyfunctional acyl halide so as to form a highly crosslinked film of polyamine-polyamide interfacially.

Such amino compounds, for example are those represented by the following:

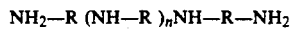

where R is —CH$_2$—, —CH$_2$CH$_2$, or any higher alkyl radical up to didecyl and n=1 to 50. It is understood that the high numbers of n relate to polymers such as for example polyethylene imine.

Non aliphatic amino compounds may also be used both as substitutes for piperazine or in combination with piperazine, polyamines etc. They are represented by the following:

R$^1$—NH—A—NH—R$^2$ (Formula I)

wherein A represents a heterocyclic or aromatic group, i.e. a group having from 2 to 8 carbon atoms, a divalent alicyclic group, a divalent aromatic group, or a divalent heteroaromatic group and R$^1$ and R$^2$ each represents an alkyl group having from 1 to 3 carbon atoms;

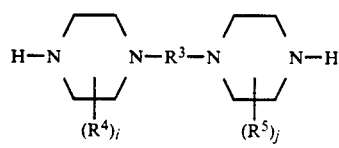
(Formula II)

wherein R$^3$ represents an alkylene group having from 0 to 4 carbon atoms, R$^4$ and R$^5$ each represents an alkyl group having from 1 to 3 carbon atoms, and i and j represents an integer of 0 to 4.

(Formula III)

wherein R$^6$ and R$^7$ each represents an alkyl group having from 1 to 3 carbon atoms and k, l and m each represent an integer of 0 to 4:

(Formula IV)

wherein R$^8$ represents an alkyl group having from 1 to 3 carbon atoms, n represents 0, 1, or 2, and p represents an integer of 0 to 4.

Preferred examples of the above formulae include:

Formula I

N,N'-dimethylethylene diamine, N,N'dimethylpropylene diamine, N,N' dimethyl-m-phenylene diamine, N,N' dimethyl-p-phenylene diamine, 2,6 dimethyl 4-amino piperidine, etc.

Formula II

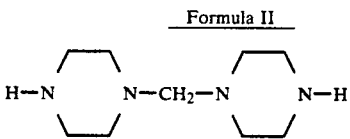

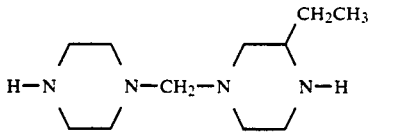

Formula III

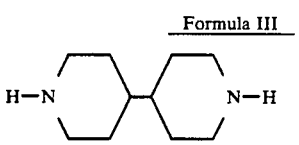

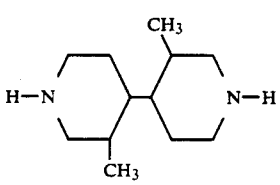

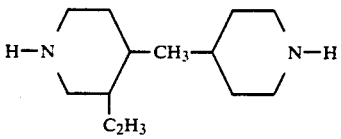

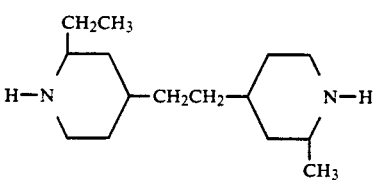

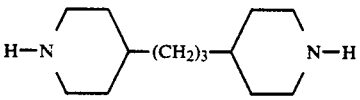

Formula IV

Piperazine, 2 methylpiperazine, 2,5- dimethyl piperazine, etc.

The above listed amino compounds are used preferably in concert with the polyamines of this invention, or as mixtures of the different polyamines of this invention with any combination of the above.

The composite semipermeable membrane is prepared according to the present invention by coating or impregnating a porous substrate with an aqueous solution comprising a water soluble or dispersible reducing latex, (one containing

double bonds in the organic polymer latex structure or containing reducing organic chemical groups including primary amino, secondary amino (capable of forming imines [i.e. —C=NH—], phenolic, catecholic, hydroquinonic, resorcinbolic, or any other organic functional group, polymeric material or organic material, which are capable of being easily oxidized by chlorine or hypochlorites) and a combination of amino compounds one of which is a polyamino compound and the other an amino compound having at least two secondary amino groups in the molecule, thereafter contacting the porous substrate with a polyfunctional crosslinking reagent capable of reacting with secondary amino groups to polymerize the amino compounds by crosslinking, and then heating or drying to remove solvents and/or postcure the polyamine-polyamides.

The aqueous phase solution is prepared such that the polyamino and/or amino compound is contained therein in an amount of from 10 to 500 parts by weight, and preferably from 20 to 300 parts by weight, based upon 100 parts by weight of the reducing polymer latex solids, and the total content of the latex solids and the polyamino-amino compounds is from 0.05 to 10% by weight (preferably from 0.1 to 5% by weight). This solution may contain a surface active agent for reducing surface tension in the case of coating or impregnating the porous substrate. The thickness of the ultrathin film (which depends upon the concentration of the latex component and the amino-polyamino compounds in the aqueous solution and the contacting time with the polyacyl halide is generally from 50 to 1000 Å (preferably from 100–500Å).

If the ultrathin film is too thin, partial defects are caused on the film surface. On the other hand, if it is too thick, water permeability decreases.

The porous substrate used in the present invention is suitably a membrane having an asymmetric structure wherein the surface pore size is generally from 50 to 500 Å. For example, polysulfone, polyether sulfone, or polyvinylidene fluoride can preferably be used.

Particularly, polysulfone is more desirous for preparation of this porous base film substrate because of its demonstrated oxidative stability. The porous membrane may be re-inforced by backing with a fabric or a nonwoven web material.

The acyl chloride (bromide or iodide) reagent used in the present invention is a compound having 2 or more functional groups (capable of reacting with primary and secondary polyamino compounds as well as with secondary di-amino compounds related to piperazine or any other organic functional group possessing a reactable proton such as the hydroxyl group, amide groups, mercaptan groups, or mixtures thereof,) for example, one or more kinds of acid halide groups, halogen sulfonyl groups, N-halo formyl groups, haloformate groups and acid anhydride groups, etc. in the molecule. Preferred examples include isophthaloyl chloride, terephthaloyl chloride, trimellitic acid chloride, trimellitic anhydride chloride, benzene-1,3-disulfonyl chloride, picolinic acid chloride, 5 chlorosulfonyl isophthaloyl chloride, and piperazine-N,N-dicarboxylic acid dichloride. Isophthaloyl chloride and trimesoyl chloride are particularly preferable. Other crosslinkers would include multifunctional isocyanates.

The following examples are presented to better illustrate the invention.

EXAMPLE 1

A porous polyether sulfone substrate film on a nonwoven polyester support fabric was evenly coated (by immersion) with an aqueous phase solution containing 0.75% by weight of the reducing latex butadiene-styrene latex polymer (50% solids) (Dow 238A), 0.25% by weight of the amino compound piperazine, and 0.5% by weight of sodium hydroxide in 100 ml of pure water.

It was then immersed for 30 seconds in the organic phase solution, that is, a n-hexane solution of 1% crosslinkers i.e. 0.4% by weight of trimesoyl chloride and 0.6% by weight of isophthaloyl chloride. The substrate was removed, allowed to dry in air and then allowed to set overnight at room temperature. The resulting thin film-latex impregnated composite membrane was tested in a stirred R.O. test cell at 60 psi using the following solutions consecutively:

| Solution #1 | 200 ppm $Ca^{+2}$ (As $CaCl_2.2H_2O$) |
| --- | --- |
| (pH 4.8) | 150 ppm $Na^+$ (As NaCl) |
| Solution #2 | 200 ppm $Ca^{+2}$ (As $CaSO_4$) |
| (pH 3.7) | 150 ppm $Na^+$ (As NaCl) |

Rejections and fluxes were as follows:

| | % Rejection $Ca^{+2}$ | % Rejection $Na^+$ | Flux GFD* |
| --- | --- | --- | --- |
| Solution #1 | 63.2 | 60.0 | 12.2 |
| Solution #2 | 95.1 | 88.4 | 9.7 |

*Gallons of solution per square foot of membrane per day.

The above membrane which had no polyamine in its formulation, rejected both $Ca^{+2}$ and $Na^+$ nearly equivalent and thus is not a good softening membrane.

EXAMPLE 2

Membranes were fabricated and tested as in Example 1 using the following mixture in 100 ml pure water:

| Styrene-butadiene latex (50% solids) | 0.24 gm |
| --- | --- |
| Piperazine | 0.23 gm |
| Sodium hydroxide | 0.50 gm |
| Tetraethylene pentamine(TEPA) | 0.02 gm |

Rejections and fluxes were as follows:

| | Rejection $Ca^{+2}$ | % Rejection $Na^+$ | Flux (GFD) |
| --- | --- | --- | --- |
| Solution #1 | 23.0 | 4.6 | 15.2 |
| Solution #2 | 44.0 | 5.9 | 13.0 | the results show a fair separation of $Ca^{+2}$ from $Na^+$ when using 0.02 gm of the polyamine TEPA.

EXAMPLE 3

Membranes were fabricated and tested as in Example 1 using a membrane formulation based on % by weight of material in 100 ml of pure water as follows:

| Styrene-butadiene latex | 0.50 gm |
| --- | --- |
| Piperazine | 0.25 gm |
| Sodium hydroxide | 1.00 gm |
| Tetraethylene pentamine(TEPA) | 0.25 gm |

Rejections were as follows:

| | % Rejection $Ca^{+2}$ | % Rejection $Na^+$ | Flux (GFD) |
| --- | --- | --- | --- |
| Solution #1 | 23.1 | 9.5 | 12.5 |

Results show poor rejections of both $Ca^{+2}$ and $Na^+$.

EXAMPLE 4

Membranes were again fabricated and tested as in Example 1 using the following formulation:

| | |
|---|---|
| Styrene-butadiene latex (50% solids) | 0.25 gm |
| Sodium hydroxide | 0.50 gm |
| Tetraethylene pentamine(TEPA) | 3.00 gm |

Immersion in the organic phase solution was for 60 seconds.

Rejection were as follows:

| | % Rejection $Ca^{+2}$ | % Rejection $Na^+$ | Flux (GFD) |
|---|---|---|---|
| Solution #1 | 29.0% | 32.6 | 13.4 |
| Solution #2 | 49.0 | 28.4 | 9.0 |

The results show that excess polyamine (TEPA) in reaction with tri and diacyl halides does not appear to produce a desirable softening membrane.

EXAMPLE 5

Membrane formulation is as follows:

| | |
|---|---|
| Styrene-butadiene latex | 0.25 gm |
| Piperazine | 0.17 gm |
| Sodium hydroxide | 0.5 gm |
| Tetraethylene pentamine(TEPA) | 0.08 gm |

Immersion in the organic phase solution was for 10 seconds.

Rejections were as follows:

| | % Rejection $Ca^{+2}$ | % Rejection $Na^+$ | Flux (GFD) |
|---|---|---|---|
| Solution #1 | 25.1% | 12.0% | 7.2 |
| Solution #2 | 38.7% | 13.4% | 5.9 |

The results show an about 2:1 piperazine to polyamine weight content gives a fair softening membrane in solution #2 (a mixture of calcium sulfate and sodium chloride) but not in mixed solution #1 (salts of calcium chloride and sodium chloride).

EXAMPLE 6

Membrane formulation is as follows:

| | |
|---|---|
| Styrene-butadiene | 0.25 gm |
| Piperazine | 0.21 gm |
| Sodium hydroxide | 0.50 gm |
| Tetraethylene pentamine(TEPA) | 0.04 gm |

Immersion in the organic phase solution was for 60 seconds Rejections were as follows:

| | % Rejection $Ca^{+2}$ | % Rejection $Na^+$ | Flux (GFD) |
|---|---|---|---|
| Solution #1 | 62.8 | 17.0 | 6.0 |
| Solution #2 | 94.0 | 39.5 | 4.1 |

The results show excellent rejections of calcium salts and poor to fair rejections of sodium salts.

EXAMPLE 7

This example was a repeat of Example 6 except that immersion in the organic phase was for only 30 seconds instead of 60 seconds. Rejections were as follows:

| | % Rejection $Ca^{+2}$ | % Rejection $Na^+$ | Flux (GFD) |
|---|---|---|---|
| Solution #1 | 54.4 | 12.2 | 6.45 |
| Solution #2 | 88.0 | 34.9 | 4.82 | the results show good rejection of calcium salts and poor to fair rejections of sodium slats. It appears that curing for thirty seconds is not as good as the sixty seconds used in Example #6.

EXAMPLE 8 membrane formulation:

| | |
|---|---|
| Styrene-butadiene latex | 0.25 gm |
| Piperazine | 0.23 gm |
| Sodium hydroxide | 0.50 gm |
| Tetraethylene pentamine(TEPA) | 0.02 gm |

Immersion in the organic phase solution was for 30 seconds.

Rejections were as follows:

| | % Rejection $Ca^{+2}$ | % Rejection $Na^+$ | Flux (GFD) |
|---|---|---|---|
| Solution #1 | 23.0 | 4.6 | 15.3 |
| Solution #2 (pH 3.65) | 42.0 | 22.4 | 11.8 |

EXAMPLE 9

The membrane of Example #8 was tested with Solution #2 adjusted to a pH of 8.80 by addition of 1.0N NaOH.

Rejections were as follows:

| | % Rejection $Ca^{+2}$ | % Rejection $Na^+$ | Flux (GFD) |
|---|---|---|---|
| Solution #2 (pH 8.8) | 44.0 | 5.9 | 13.2 |

In comparison to Example #8 (Solution #2 results) it was surprisingly found that while $Ca^{+2}$ rejection (with only a pH variance) remains essentially constant, there is a marked drop in the $Na^+$ rejection from ~20% to ~6-8%. Flux remains close despite the pH variance.

The pH variance to $Ca^{+2}$ separations in Examples 8 and 9 show that the nitrogen electron pairs on the excess unreacted polyamines of the TFC of this invention do not appear to affect the transport of $Ca^{+2}$ ions across these membranes probably because of the $Ca^{+2}$ $$-Nitrogen\diagdown^{\diagup}$$

coordination.

EXAMPLE 10

The membrane of Example #7 was washed with 1N ammonium hydroxide for ten minutes and then immersed for 1 hour in methyl alcohol to remove water. It was noticed that the TFC layer which is normally the concave part of the 1¾" circle, switched to being the convex part due to the alcohol immersion. This membrane was then placed in a constantly saturated methyl alcohol solution of methyl chloride overnight (or 16-18 hours) so as to convert most free amino groups still present in the TFC membrane into quaternized ammonium halides. This procedure removes available electron pairs from each amino nitrogen and is a test to see whether calcium —nitrogen$\diagup\diagdown$ coordination possibilities can be removed from this membrane is an attempt to determine if nitrogen-calcium complexes are the reasons why calcium is being selectively detained from passage through the membrane. Sodium ions do not coordinate with the electron pairs of polyamino compounds.

After overnight reaction the membrane is immersed in water whence the convex TFC (non methylated) switched back to concave part. The membrane was mounted in a stirred R.O. test cell and tested as follows:

|  | % Rejection $Ca^{+2}$ | % Rejection $Na^+$ | Flux (GFD) |
| --- | --- | --- | --- |
| Solution #2 (pH = 3.7) | 49.5 | 0 | 11.7 |

The results show that the exhaustive methylation of the Example #7 membrane caused both the rejections of calcium and sodium to drop and the flux to essentially double. This is indicative of pore size amplification and apparently dispels any mechanism whereby $Ca^{+2}$ is being coordinated by unquarternized amino nitrogens at a pH of ~3.7.

EXAMPLE 11

The membrane of Example #10 (i.e. methylated membrane from Example #7) was tested once again using solution #2 which had its pH raised by addition of 8N KOH.

|  | % Rejection $Ca^{+2}$ | % Rejection $Na^+$ | Flux (GFD) |
| --- | --- | --- | --- |
| Solution #2 (pH = 11.5) | 52.0 | 0 | 14.3 |

The results of Examples 10 and 11 show that the exhaustive methylation of the membrane of Example #7 gives $Ca^{+2}$ and $Na^+$ rejections of similar magnitudes regardless of the solution pH. Flux is increased to 14.3 from 11.7 which is believed not significant in comparison to the twofold flux increase due to methylation.

Again it has been shown that decreasing the availability of the nitrogen electron pairs (i.e. by acidification or methylation) does not affect the transport across membranes of calcium ions due to coordination complex formation.

EXAMPLE 12

The membrane of Example 6 was tested with a Solution #3, a high solids water (~3200 ppm) containing ~2000 ppm hardness as $CaCO_3$ and a sulfate to chloride ratio of nearly 4 to 1. Sodium ions were present in approximate concentrations of ~200 ppm while calcium and magnesium came to a combined total of 685 ppm.

| % Rejection $Mg^{+2}$ | % Rejection $Ca^{+2}$ | % Rejection $Na^+$ | Flux (GFD) |
| --- | --- | --- | --- |
| 69.0 | 67.3 | 17.0 | 9.5 |

These results show good hardness ($Mg^{+2}$ and $Ca^{+2}$) separation on a hard water of ~3200 ppm of total dissolved solids.

EXAMPLE 13

A membrane formulation using no latex was prepared as follows:

| Piperazine | 0.42 gm |
| --- | --- |
| Sodium hydroxide | 0.5 gm |
| Tetraethylene pentamine(TEPA) | 0.08 gm |

Immersion in the organic phase solution was for 30 seconds.

|  | % Rejection $Ca^{+2}$ | % Rejection $Na^+$ | Flux (GFD) |
| --- | --- | --- | --- |
| Solution #2 | 95.2 | 95.4 | 4.8 |

The results show that the membrane (without a latex of polystyrene-butadiene in the aqueous phase) failed in separating calcium salts from sodium salts and thus is not classified as a nanofilter softening membrane.

EXAMPLE 14

A similar membrane was prepared as in Example #1 except that no latex was included, thus this membrane did not contain any latex or polyamine.

Results hereinafter show that without the use of reducing latex or polyamines, the TFC did not have resistance to chlorine attack.

EXAMPLE 15

The membrane of Example 6 was pressure tested at 60 psi using a solution mixture of 500 ppm sucrose (MW=342.3 Daltons) and 200 ppm $Ca^{+2}$ (680 ppm $CaSO_4$) and evaluated for salt-sugar separation. The following was found:

| Substance | % Rejection | GFD |
| --- | --- | --- |
| Sucrose | 93.1 | 10.3 |
| $Ca^{+2}$ | 93.3 | 10.3 |

The above result shows nearly complete rejection of both sucrose and calcium ions.

EXAMPLE 16

The membrane of Example 6 was tested in a solution of 500 ppm dextrose (MW=180.2 Daltons) and 200 ppm Ca+2 (680 ppm CaSO4) at 60 psi and evaluated for salt-dextrose separation.

The following was found:

| Substance | % Rejection | GFD |
|---|---|---|
| Dextrose | 58.0 | 10.8 |
| Ca++ | 86.2 | 10.8 |

The above result shows greater than 50% rejection of dextrose and nearly all of Ca+2 salt. Ths would indicated a molecular weight cutoff of about 200 Daltons.

EXAMPLE 17

TFC membranes from Examples 1, 2, 6, 13 and 14 were concurrently tested (at 25° C.) over a 32 day period for chlorine tolerance and for rejection and water flux in treating a mixed 200 ppm Ca+ (680 ppm CaSO4)-150 ppm Na+(381.5 ppm NaCl)solution at a pH of 3.8-4.0 in the presence of 200 ppm (maintained) chlorine (a total exposure of 150,000 ppm-hrs of chlorine).

The test results show (based on % rejection) that membranes prepared with the polyamine TEPA have improved resistance to hypochlorite oxidation even where the latex emulsion is not an added ingredient as is the case in the membrane of Example 13. It appears that the polyamine is preferentially oxidized over that of the polyamide piperazine.

where A represents an alkylene group having from 2 to 8 carbon atoms, a divalent alicyclic group, a divalent aromatic group and where $R^1$ and $R^2$ each represent an alkyl group having from 1 to 3 carbon atoms.

IV:

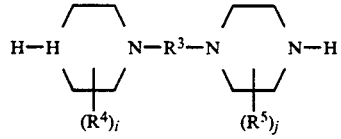

wherein $R^3$ represents an alkylene group having from 0 to 4 carbon atoms, $R^4$ and $R^5$ each represents an alkyl group having from 1 to 3 carbon atoms; and i and j each represents an integer of 0 to 4;

V:

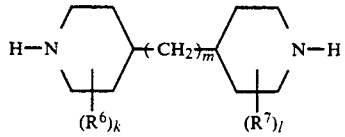

wherein $R^6$ and $R^7$ each represent an alkyl group

| MEMBRANE EXAMPLE | RATIO TEPA/ PIPERAZINE | EMULSION USED | INITIAL TEST | | | 32 DAY TEST | | |
|---|---|---|---|---|---|---|---|---|
| | | | % CA+2 REJECTION | FLUX (GFD) | % NA+ REJECTION | % CA+2 REJECTION | FLUX (GFD) | % NA+ |
| 1 | 0/.25 = 0 | POLYSTYRENE-(PS) BUTADIENE | 95.1 | 9.7 | 88.4 | 16.3 | 48.0 | 8.2 |
| 2 | .02/.23 = 0.087 | PS-BUTADIENE | 44.0 | 13.0 | 5.9 | 8.2 | 101.6 | 0 |
| 6 | .04/.21 = 0.190 | PS-BUTADIENE | 94. | 4.1 | 39.5 | 22.4 | 45.9 | 3.2 |
| 13 | .08/.42 = 0.190 | NONE | 95.2 | 4.8 | 95.4 | 29.5 | 16.9 | 12.0 |
| 14 | 0/.25 = 0 | NONE | 87.0 | 18.0 | 76.4 | 0 | 61.6 | 0 |

Various modifications may be made to the procedures described herein as would be obvious to one having the ordinary skill in the art and such modifications are considered to be included within the scope of the invention, most especially those involving the use of emulsions having reducing polymers and the variance in polyamine to piperazine or compounds similar to piperazine in the aqueous phase. Various features of the invention are set forth in the claims which follow.

I claim:

1. A water insoluble film comprising the polymerization product of:

at least one compound selected from the group consisting of compounds having Formula I and II:

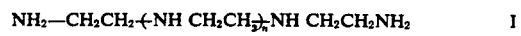   I where n is a number between 0 and about 12;

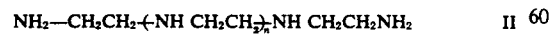   II where n is a number between about 200 and about 700;

at least one compound selected from the group consisting of compounds having Formulas III through VI:

   III having from 1 to 3 carbon atoms and k, l and m each represent an integer of 0 to 4;

VI:

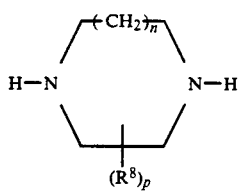

wherein $R^8$ represents an alkyl group having from 1 to 3 carbon atoms, n represents 0, 1, or 2, and p represents an integer of 0 to 4; and at least one soluble compound having at least 2 functional moieties each selected from the group consisting of carboxylic acid halides, carboxylic acid anhydrides, haloformyls, haloformates, sulfonyl halides and isocyanate;

said film characterized by having initially simultaneously a calcium ion rejection in excess of 50 percent and a sodium ion rejection less than 50 percent in a reverse osmosis test.

2. A film according to claim 1 further characterized by being supported on a porous substrate containing at least one polymer selected from the group consisting of polyether sulfone, polysulfone and polyvinylidene fluoride.

3. A porous substrate containing at least one polymer selected from the group consisting of polyethersulfone, polysulfone and polyvinylidene fluoride, said substrate having on and/or in one surface thereof a film according to claim 1.

4. A reverse osmosis apparatus comprising a film in accordance with claim 1.

5. A process for softening water comprising forcing said water through a film which is in accordance with claim 1.

6. A film according to claim 1 further characterized by containing polymers derived from the group consisting of nitrile latexes, styrene-butadiene latexes, styrene-butadiene-4-vinylpyridine latexes and phenolic latexes.

7. A water insoluble film comprising the polymerization product of:

at least one compound selected from the group consisting of compounds having Formula I:

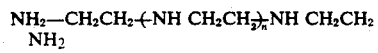   I where n is a number between 0 and about 12;

at least one compound selected from the group consisting of compounds having Formula II:

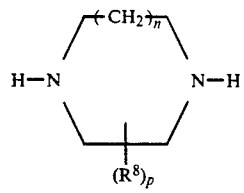   II:

wherein $R^8$ represents an alkyl group having from 1 to 3 carbon atoms, n represents 0, 1, or 2, and p represents an integer of 0 to 4;

at least one soluble compound having at least 2 carboxylic acid halide moieties; said film characterized by having simultaneously a calcium ion rejection in excess of 50 percent and a sodium ion rejection less than 50 percent in a reverse osmosis test and by being supported on a porous substrate containing at least one polymer selected from the group consisting of polyether sulfone, polysulfone and polyvinylidene fluoride.

8. A reverse osmosis apparatus comprising a film in accordance with claim 7.

9. A process for softening water comprising forcing said water through a film which is in accordance with claim 7.

* * * * *